United States Patent [19]

Nihei et al.

[11] 4,396,823

[45] Aug. 2, 1983

[54] METHOD OF ELECTRODE CURRENT CONTROL IN WELDING APPARATUS HAVING A PLURALITY OF ELECTRODES

[75] Inventors: Masayasu Nihei, Hitachi; Satoshi Kokura, Hitachiota; Eiji Ashida, Hitachi; Yuzo Kozono, Hitachi; Akira Onuma, Hitachi, all of Japan

[73] Assignee: Hitachi, Ltd., Tokyo, Japan

[21] Appl. No.: 313,832

[22] Filed: Oct. 22, 1981

Related U.S. Application Data

[63] Continuation of Ser. No. 99,848, Dec. 3, 1979, abandoned.

[30] Foreign Application Priority Data

Dec. 8, 1978 [JP] Japan .................................. 53-151148

[51] Int. Cl.³ ............................................... B23K 9/09
[52] U.S. Cl. ............................ 219/137 PS; 219/130.51
[58] Field of Search ...................... 219/130.51, 137 PS

[56] References Cited

U.S. PATENT DOCUMENTS 3,627,974 12/1971 Normando et al. ............ 219/130.51

FOREIGN PATENT DOCUMENTS 51-37900 10/1976 Japan .
52-32732 8/1977 Japan .
52-145353 12/1977 Japan .
1450912 9/1976 United Kingdom .

Primary Examiner—C. C. Shaw
Attorney, Agent, or Firm—Antonelli, Terry & Wands

[57] ABSTRACT

In a welding apparatus having a plurality of electrodes and adapted for carrying out welding operation on a workpiece by alternately supplying currents to the individual electrodes through switching elements, an apparatus and method of controlling the currents supplied to the electrodes, comprising selecting the values of the currents supplied to the individual electrodes depending on the material of the workpiece, and carrying out the welding operation on the workpiece by alternately supplying the currents of the selected values to the individual electrodes respectively through the switching elements. The method is featured by the fact that the ratio between the individual currents is selected under the condition that the sum of the values of all the currents is maintained at a predetermined value. It is also featured by the fact that, depending on the welding condition, the values of the individual currents can be freely selected without the limitation of maintaining the sum of all the currents at the predetermined value. Therefore, the apparatus and method are applicable to welding of a variety of materials by selecting the values of the individual currents depending on whether the workpiece has a high or low melting point and also whether the workpiece has a high or low heat conductivity.

21 Claims, 18 Drawing Figures

$P = 3.3 \times 10^{-3} \cdot I^2$

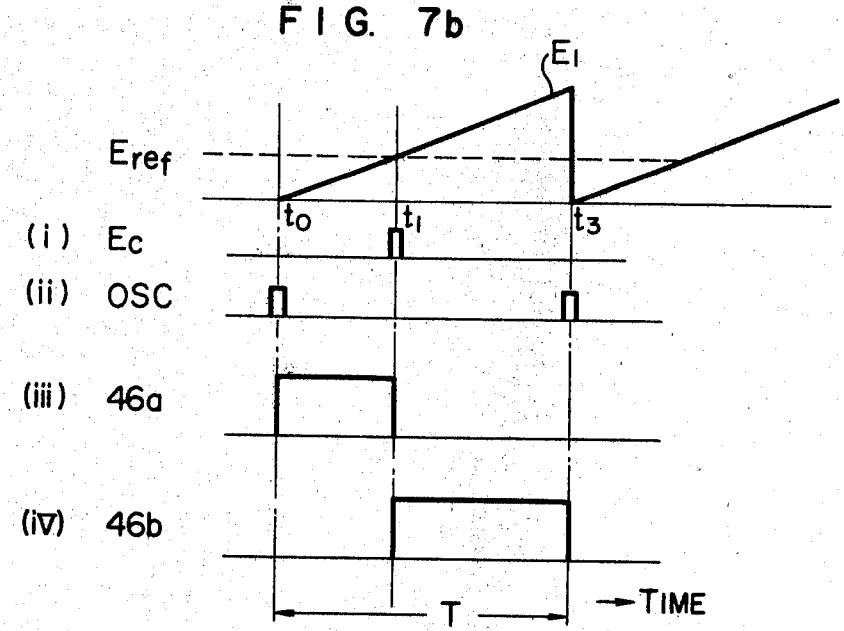
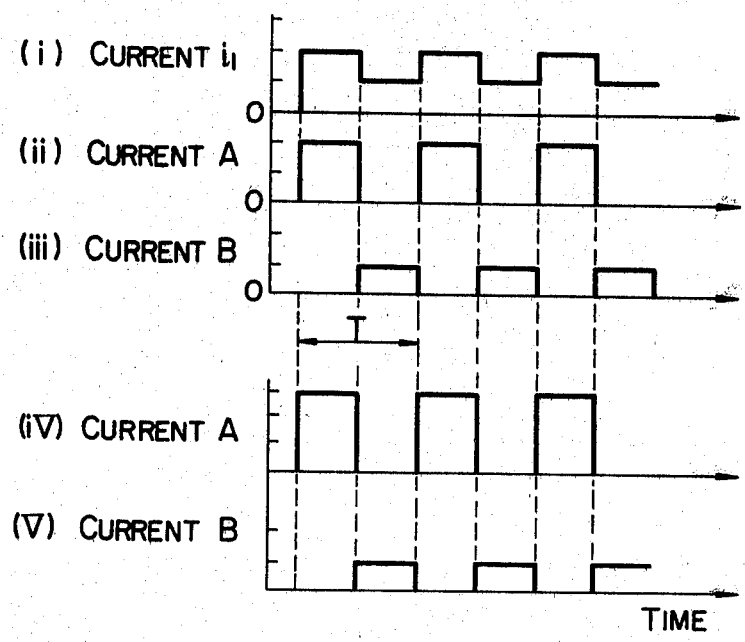

METHOD OF ELECTRODE CURRENT CONTROL IN WELDING APPARATUS HAVING A PLURALITY OF ELECTRODES

This is a continuation of application Ser. No. 099,848, filed Dec. 3, 1979, now abandoned.

This invention relates to a welding apparatus of multi-electrode type, and more particularly to an apparatus and method of controlling welding currents supplied to individual electrodes of such a welding apparatus.

A welding apparatus of two-electrode type is most typical of or most commonly used among welding apparatus of multi-electrode type, and various proposals have been made hitherto for controlling welding currents supplied to the individual electrodes of such a welding apparatus. In one of the proposals, a single DC power source is provided in common to the two welding electrodes for supplying welding currents to the individual welding electrodes which make welding operation on a workpiece to be welded, and a pair of switching elements connected in series with these two electrodes respectively are alternately turned on and off to alternately supply the welding currents to the two electrodes. For example, Japanese Patent Application Laid-Open No. 52-145353 discloses a method in which a welding current is supplied from a single welder power source to two electrodes through a high-speed change-over switch which is composed of a pair of switching elements alternately turned on and off at a high frequency. In a preferred embodiment disclosed in the cited patent application, a pair of thyristors are used to constitute the high-speed change-over switch.

As another proposal, Japanese Pat. No. 869617 (Japanese Patent Publication No. 51-37900) assigned to the assignee of the present patent application discloses a method of gas-shielded arc welding on a workpiece using a non-consumable electrode, in which welding currents are alternately supplied to the non-consumable electrode and to a filler material respectively so as to carry out welding operation while changing over the spot of arc generation. The efficiency of gas-shielded arc welding, especially, TIG (tungsten inert gas arc welding) can be improved by supplying a welding current to flow between the filler material and the workpiece thereby generating an arc separately from the arc jumping across the non-consumable electrode and the workpiece. In the cited patent, the welding currents supplied to the two electrodes are alternately switched so as to prevent the tendency of mutual interference between the two arcs.

As still another proposal, Japanese Pat. No. 904440 (Japanese Patent Publication No. 52-32732) assigned also to the assignee of the present patent application discloses a method of arc welding in which the gap of the bevel defined between two workpieces to be welded together is reduced to an allowable minimum. Welding operation with a single electrode and welding operation with two electrodes are described in the cited patent. Welding with the single electrode is defective in that the molten metal is not sufficiently deposited on the surface of the bevel, and therefore, welding with the two electrodes is employed to obviate the above defect. Due to, however the fact that the electromagnetic action between the arcs generated from the two electrodes may deflect the jumping directions of the arcs thereby tending to greatly adversely affect the effect of welding, an arrangement is provided so that the welding currents may not be simultaneously supplied to the two electrodes. A welding apparatus of multi-electrode type proper is also disclosed in British Pat. No. 1,450,912, and it is thus already well known to switch the currents supplied to the two electrodes by a switching means such as that including a pair of thyristors.

It is a primary object of the present invention to provide an apparatus and method of controlling currents supplied to a plurality of electrodes of a welding apparatus of multi-electrode type, which apparatus and method can rationally control the currents supplied to the individual electrodes so that the welding apparatus of this type can find a widened range of applications in this field of welding.

Another object of the present invention is to provide an apparatus and method of the above character in which the currents supplied to the individual electrodes of the welding apparatus are controlled under the condition that the sum of the values of all the currents is maintained at a predetermined value.

Still another object of the present invention is to provide an apparatus and method of the above character in which the currents supplied to the individual electrodes of the welding apparatus can be controlled independently of each other.

The method and apparatus according to the present invention are featured by the fact that the values of the currents supplied to the individual electrodes of the welding apparatus of multi-electrode type are selected depending on the material of a workpiece to be welded by the welding apparatus, and the currents of the selected values are supplied to the individual electrodes respectively to carry out the desired welding operation on the workpiece.

The method and apparatus according to the present invention are further featured by the fact that the currents supplied to the individual electrodes of the welding apparatus are controlled to satisfy the condition that the sum of the values of the current supplied to the individual electrodes respectively is maintained at a predetermined value.

The method and apparatus according to the present invention are further featured by the fact that the currents supplied to the individual electrodes of the welding apparatus have the same amplitude but are different in their durations when the currents supplied to the individual electrodes are controlled to satisfy the condition that the sum of the values of the individual currents is maintained at the predetermined value.

According to one aspect of the present invention, there is provided an apparatus and method of controlling currents supplied to a plurality of electrodes of a welding apparatus of multi-electrode type adapted for carrying out welding operation on a workpiece by alternately supplying the currents to the individual electrodes respectively through the current switching means, the method comprising the steps of selecting the values of the currents supplied to the individual electrodes depending on the material of the workpiece, and carrying out the welding operation on the workpiece by alternately supplying the currents of the selected values to the individual electrodes respectively through the current switching means. The above and other objects, features and advantages of the present invention will become more apparent from the following detailed description of the present invention made by referring to the preferred embodiments when taken in conjunction with the accompanying drawings, in which:

FIG. 7b is a time chart illustrating the operation of the pulse generator shown in FIG. 7a;

FIG. 7c is a time chart of the currents alternately supplied to the two electrodes of the welding apparatus shown in FIG. 6;

In a multi-electrode type welding apparatus, a method of alternately supplying welding currents to the individual electrodes thereby preventing an objectionable magnetic interference between the arcs is proved remarkably effective, since the welding apparatus can make its welding operation on a workpiece at a high speed and a high efficiency.

Figure 1:
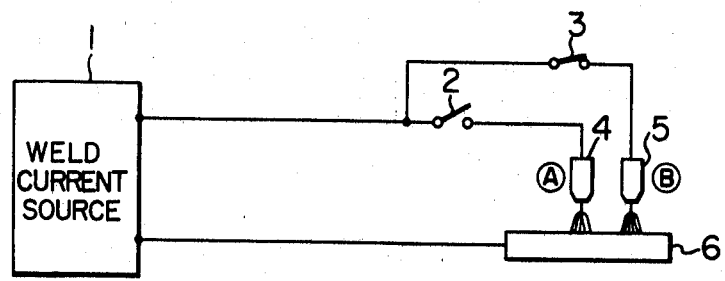
FIG. 1 is a diagrammatic view illustrating a manner of controlling welding currents supplied to individual electrodes of a two-electrode type welding apparatus.

FIG. 1 illustrates the basic idea of such a manner of welding current control in a two-electrode type welding apparatus. Referring to FIG. 1, a welding current source 1 is connected at one of its terminals to a pair of welding torches or electrodes 4 and 5 through a pair of semiconductor switches 2 and 3 arranged in parallel and at the other terminal to a workpiece 6 to be welded. The switches 2 and 3 are alternately tuned on and off to alternately supply welding currents A and B to the electrodes 4 and 5 respectively.

Figure 2:
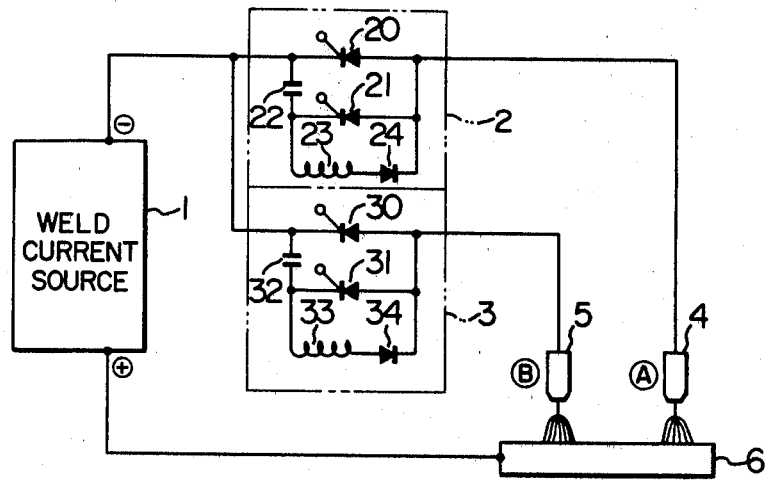
FIG. 2 is a view similar to FIG. 1 but showing the detailed structure of the switches.

FIG. 2 shows the detailed structure of the semiconductor switches 2 and 3 shown in FIG. 1, by way of example. Referring to FIG. 2, the switches 2 and 3 are of the same structure and include main thyristors 20, 30 provided for the current switching purpose, auxiliary thyristors 21, 31 for turning off the respective main thyristors 20, 30, capacitors 22, 32, coils 23, 33, diodes 24, 34, and thyristor firing circuits (not shown), respectively. In the current control for alternately supplying the welding currents A and B to the electrodes 4 and 5 respectively, the first main thyristor 20 is initially turned on to supply the welding current A to the first electrode 4 for a predetermined period of time. Subsequently, the first auxiliary thyristor 21 associated with the first electrode 4 is turned on to turn off the first main thyristor 20 and, at the same time, to turn on the second main thyristor 30 associated with the second electrode 5. When the first auxiliary thyristor 21 is turned on, the charge stored in the capacitor 22 and coil 23 is discharged in a direction reverse to that of the first main thyristor 20 thereby turning off this thyristor 20. As soon as the first main thyristor 20 is turned off, the second main thyristor 30 associated with the second electrode 5 is turned on to supply the welding current B to the second electrode 5. The second auxiliary thyristor 31 is then turned on to turn off the second main thyristor 30. This operation is the same as that done for turning off the first main thyristor 20 associated with the first electrode 4. Such an on-off cycle is repeated at a predetermined frequency to alternately supply the welding currents A and B to the electrodes 4 and 5 respectively thereby preventing the objectionable magnetic interference between the arcs.

Figure 3:
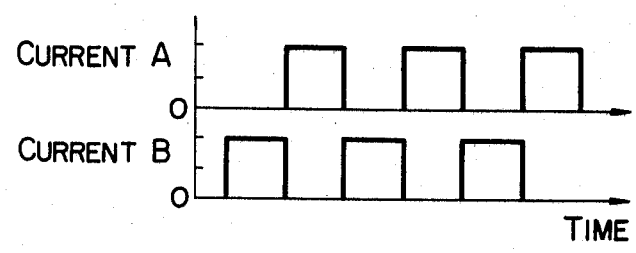
FIG. 3 is a time chart of the welding currents alternately supplied to the two electrodes respectively by alternately turning on and off the switches shown in FIG. 2.

FIG. 3 is a time chart of the welding current A supplied to the first electrode 4 and the welding current B supplied to the second electrode 5 in the welding apparatus having the construction shown in FIGS. 1 and 2. FIG. 3 illustrates the case in which the switches 2 and 3 are alternately turned on and off at a predetermined frequency. Thus, the welding currents A and B alternately supplied to the first and second electrodes 4 and 5 respectively have the same peak value and the same duration, as seen in FIG. 3.

Figure 4A:
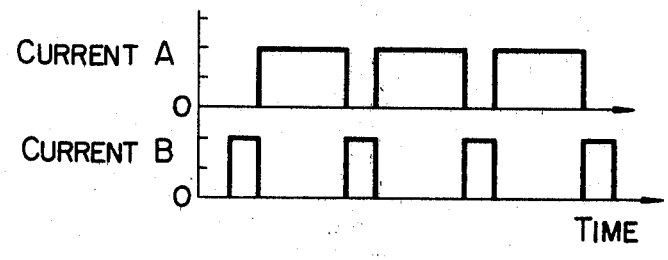
FIGS. 4a and 4b are time charts illustrating different manners of current control according to the present invention in which the values of currents supplied to the two electrodes are selected depending on the material of a workpiece to be welded.
Figure 4B:
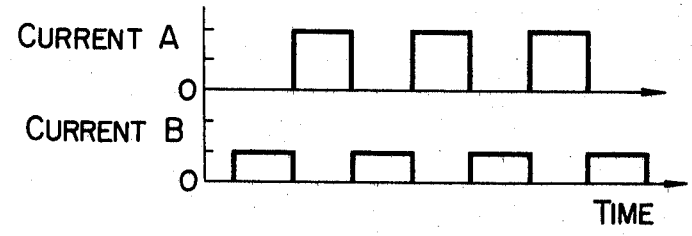

In the welding apparatus shown in FIGS. 1 and 2, the switches 2 and 3 are alternately turned on and off to alternately supply the welding currents A and B of predetermined duration to the first and second electrodes 4 and 5 respectively as seen in FIG. 3 showing the current waveforms, and the peak values of the welding currents A and B are not variable. However, depending on the material of the workpiece to be welded, it may be effective or preferable that the amplitudes and durations of the welding currents A and B are also variable. The welding apparatus shown in FIGS. 1 and 2 could not meet such a demand. In other words, this welding apparatus was not applicable to a variety of workpiece materials and welding conditions. That is, depending on the material of the workpiece to be welded, welding current waveforms as shown in FIGS. 4a and 4b may be more effective than those shown in FIG. 3. For example, in FIG. 4a, the sum of the values of the welding currents A and B supplied to the first and second electrodes 4 and 5 respectively is maintained at a predetermined value, but the duration of the welding current B supplied to the second electrode 5 differs from that of the welding current A supplied to the first electrode 4. Such a manner of welding current supply is advantageous in that the arcs are stably generated since the power required for welding by the electrodes 4 and 5 is maintained constant and the peak values of the welding currents A and B are the same. In FIG. 4b, the amplitude of the welding current B supplied to the second electrode 5 differs from that of the welding current A supplied to the first electrode 4. This manner of current supply is suitable for welding operation on a workpiece of a metal such as aluminum having a low melting point. Due to the low melting point of aluminum, the molten metal may be driven away from the weld area by the arc pressure unless the arc pressure is selected to be sufficiently low. In such a case, it is preferable to sufficiently preheat the workpiece by the leading electrode 4 and to carry out the welding operation by the trailing electrode 5 supplied with the welding current B of reduced amplitude.

Figure 5A:
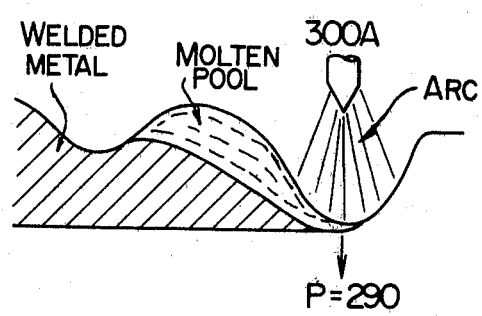
FIGS. 5a and 5b show the states of welding with a single electrode and two electrodes respectively.
Figure 5B:
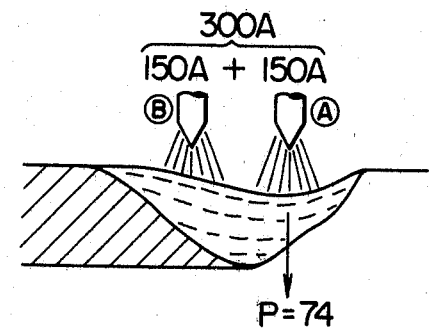
Figure 5C:
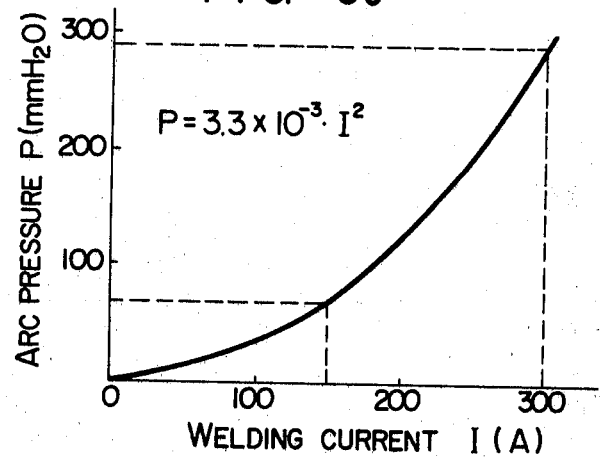
FIG. 5c shows the relation between the welding current value and the arc pressure in FIGS. 5a and 5b.
Figure 5D:
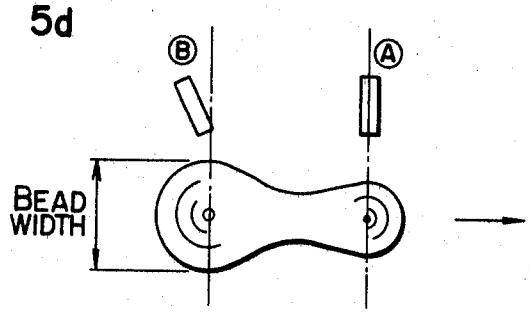
FIG. 5d shows the width of the head of molten metal when a welding operation on a metal having a relatively low melting point is carried out with the two electrodes.

The relation between the welding current and the arc pressure and the state of the molten pool produced during the welding operation will be described with reference to FIGS. 5a, 5b and 5c. FIG. 5c shows the relation between the welding current I and the arc pressure P. FIG. 5a illustrates that welding is being carried out by a single electrode supplied with a welding current of 300 A, and a molten pool is formed due to the high arc pressure. FIG. 5b illustrates that welding is being carried out by two electrodes. In this case, the sum of the values of the welding currents supplied to the two electrodes is 300 A as in FIG. 5a, and the welding current of 150 A is supplied to each of these two electrodes. In the case of FIG. 5b, the arc pressure is about ¼ of that in FIG. 5a, and the welding operation can be satisfactorily carried out without the formation of the molten pool. Thus, the welding operation with the two electrodes is advantageous over the welding operation with the single electrode. In the case of the welding operation with the two electrodes, the rate of distribution of the welding currents A and B to the respective electrodes 4 and 5 is an important problem. The inventors have confirmed the fact that, especially when welding operation is to be carried out on a workpiece of a metal such as aluminum having a low melting point, in the case of FIG. 5d, the welding operation can be effectively carried out by inclining the trailing electrode 5 supplied with the welding current B toward the advancing direction of welding relative to the leading electrode 4 supplied with the welding current A.

Figure 6:
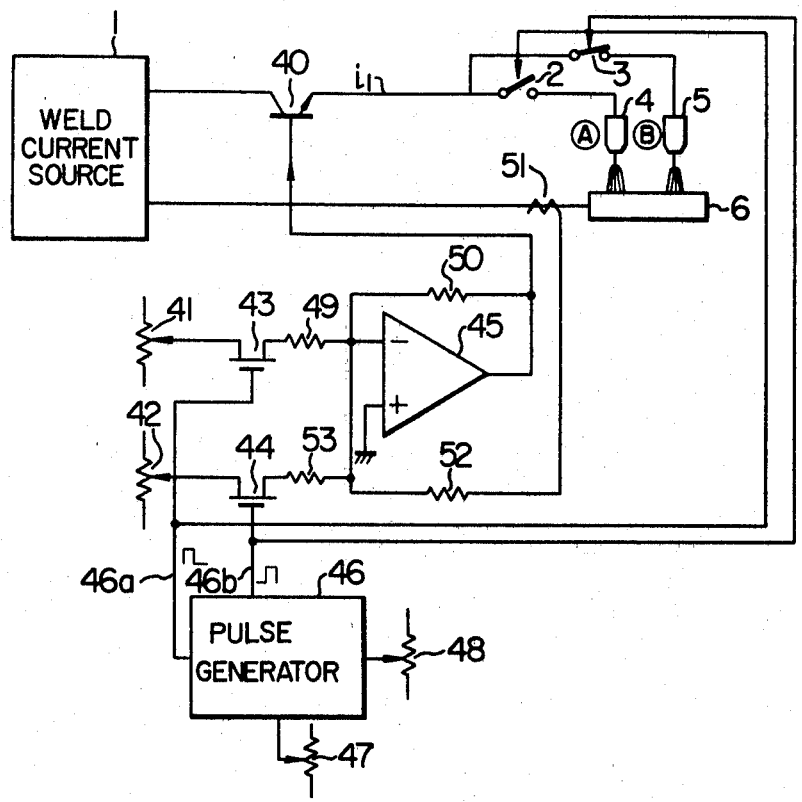
FIG. 6 is a circuit diagram of a two-electrode type welding apparatus controlled by an embodiment of the method according to the present invention.

FIG. 6 is a circuit diagram of a two-electrode type welding apparatus controlled by an embodiment of the method according to the present invention. Referring to FIG. 6, a welding current control transistor 40 is connected between a welding current source 1 and a pair of semiconductor switches 2 and 3. The base current of this transistor 40 is controlled to control the collector current $i_1$ supplied as the welding current. The base current of the transistor 40 is controlled by a control circuit including potentiometers 41, 42, FET switches 43, 44, a differential amplifier 45, resistors 49, 50, 52, 53, and a current transformer 51 provided for welding current detection. The gates of the FET switches 43 and 44 are controlled by two output pulse signals 46a and 46b from a pulse generator 46 respectively. A frequency varying potentiometer 47 is provided for varying the frequency of the pulse output signals 46a and 46b from the pulse generator 46, and a duty varying potentiometer 48 is provided for varying the duty ratio of the pulse output signals 46a and 46b.

Figure 7A:
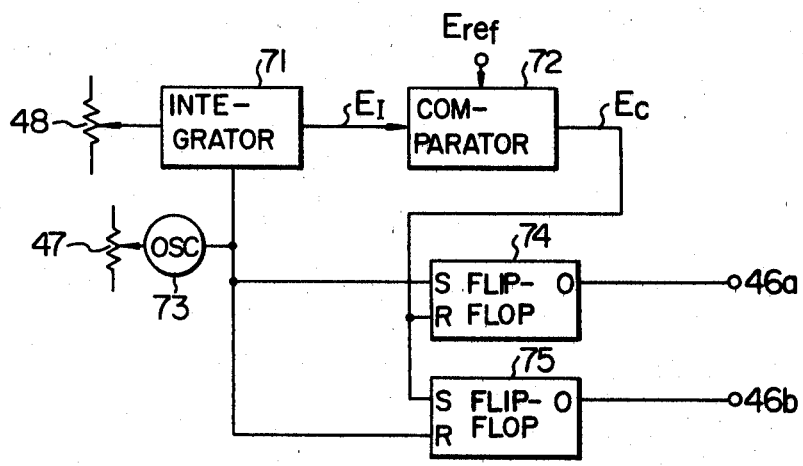
FIG. 7a is a block diagram showing the detailed structure of the pulse generator shown in FIG. 6.

The pulse generator 46 may have a structure as shown in FIG. 7a so that the duty ratio of its output pulse signals 46a and 46b can be varied by the potentiometer 48. Referring to FIG. 7a, the pulse generator 46 includes an integrator 71, a comparator 72, an oscillator 73, and a pair of flip-flops 74 and 75. A predetermined voltage applied from the potentiometer 48 is integrated by the integrator 71 from time $t_0$ to appear as an output voltage $E_I$ having a waveform as shown in FIG. 7b. This integrator output voltage $E_I$ is applied to the comparator 72 to be compared with a reference voltage $E_{ref}$. At time $t_1$, the level of the voltage $E_I$ attains the level of the reference voltage $E_{ref}$, and an output pulse signal $E_c$ as shown in (i) of FIG. 7b appears from the comparator 72. The oscillator 73 generates its output pulse signal OSC as shown in (ii) of FIG. 7b to set the first flip-flop 74 at time $t_0$, and the output pulse signal 46a appears from this flip-flop 74. In response to the application of the output pulse signal $E_c$ from the comparator 72 at time $t_1$, this flip-flop 74 is reset. Thus, as shown in (iii) of FIG. 7b, the signal 46a takes its "1" level between time $t_0$ and time $t_1$. At this time $t_1$, the second flip-flop 75 is set in response to the application of the signal $E_c$, and the output pulse signal 46b appears as shown in (iv) of FIG. 7b. This flip-flop 75 remains in the on state until it is reset by the signal OSC at time $t_3$. Thus, when the oscillation frequency of the oscillator 73 is constant, the period T from time $t_0$ to time $t_3$ is constant, and the duty ratio of the signals 46a and 46b can be varied by varying the reference voltage $E_{ref}$. That is, the sum of the durations of the signals 46a and 46b is equal to the period T since the first flip-flop 74 is reset and the second flip-flop 75 is set by the signal $E_c$ at time at which the relation $E_{ref}=E_I$ holds. The oscillation frequency of the oscillator 73 can be varied by the potentiometer 47. The potentiometers 41 and 42 are provided for setting the welding currents A and B supplied to the first and second electrodes 4 and 5 respectively. The switches 2 and 3 are controlled by the respective output signals 46a and 46b from the pulse generator 46. FIG. 7c shows the waveforms of the currents $i_1$, A and B appearing at various parts in the circuit shown in FIG. 6.

In operation, the individual potentiometers 41, 42, 47 and 48 are set at their predetermined values prior to the welding operation. The setting of the potentiometer 41 provided for controlling the welding current A supplied to the first electrode 4 is selected to be larger than that of the potentiometer 42 provided for controlling the welding current B supplied to the second electrode 5. An output pulse 46a appears first from the pulse generator 46 to turn on the FET switch 43 so that the signal corresponding to the setting of the potentiometer 41 is applied to the minus input terminal of the differential amplifier 45. The signal corresponding to the welding current detected by the current transformer 51 is also fed back to this minus input terminal of the differential amplifier 45, and the difference between the signal from the potentiometer 41 and the signal from the current transformer 51 provides the actual input to this input terminal. It will be seen in FIG. 6 that the plus input terminal of the differential amplifier 45 is grounded. The output current $i_1$ of the transistor 40 supplied to the switches 2 and 3 is controlled in relation to the output signal from the differential amplifier 45. In these switches 2 and 3, the switch 2 is turned on by the output pulse 46a from the pulse generator 46. Consequently, the output current $i_1$ of the transistor 40 passes through the switch 2 to be supplied to the first electrode 4 as the welding current A. The waveforms of these currents $i_1$ and A are shown in (i) and (ii) of FIG. 7c respectively. In this case, the current transformer 51 detects the welding current A supplied to the first electrode 4, and its output signal provides the negative feedback signal used for the stability of the welding current. As soon as the output pulse 46a disappears, an output pulse 46b appears from the pulse generator 46 to turn on the switches 44 and 3, and the output current i₁ of the transistor 40 is now supplied to the second electrode 5 as the welding current B in the manner described hereinbefore. Therefore, the welding currents A and B having the waveforms shown in (ii) and (iii) of FIG. 7c are supplied to the first and second electrodes 4 and 5 respectively. In (ii) and (iii) of FIG. 7c, the welding currents A and B have the same frequency, and the amplitude of the welding current B is ½ of that of the welding current A. However, the frequency and amplitude may be set at any desired values by suitably setting the potentiometers 47 and 48. Further, in order to maintain the predetermined welding power in each period T, the amplitude of the welding current A may be increased by the amount corresponding to the decrement of the welding current B whose amplitude is ½ of that of the welding current A, as shown in (iv) and (v) of FIG. 7c.

Although only one transistor for the welding current control purpose is illustrated in FIG. 6 for the simplicity of illustration, it is apparent that there are actually hundreds of such transistors so as to deal with the welding current of several hundred amperes.

Figure 8:
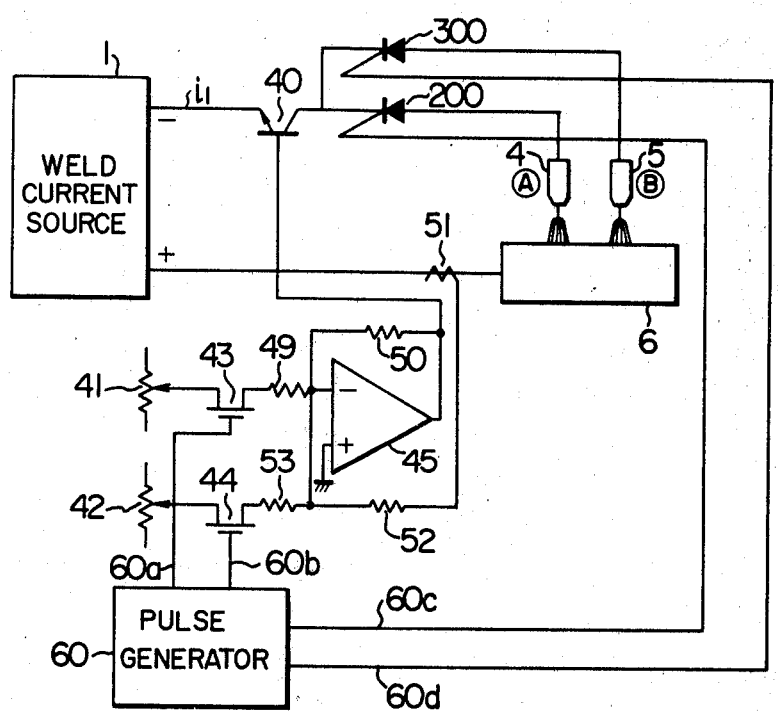
FIG. 8 is a circuit diagram of a two-electrode type welding apparatus controlled by another embodiment of the method according to the present invention.
Figure 9:
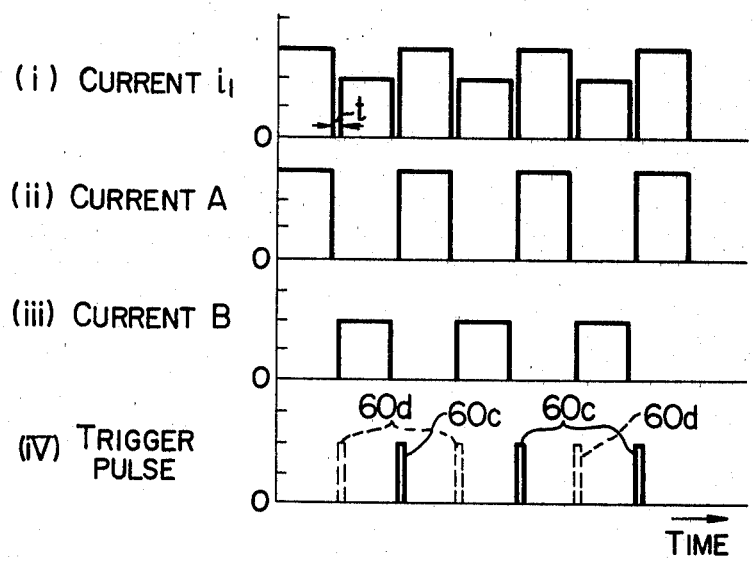
FIG. 9 is a time chart of the currents shown together with the trigger pulses in the welding apparatus shown in FIG. 8.

FIG. 8 shows a modification of the welding apparatus shown in FIG. 6. In the circuit shown in FIG. 8, thyristors 200 and 300 are used as the switches 2 and 3 respectively. Although the flowing direction of the welding currents A and B to the workpiece 6 in FIG. 8 differs from that shown in FIG. 6, such an arrangement is merely selected for conveniences and has not any special meaning. Therefore, the structure of the circuit shown in FIG. 8 is substantially the same as that of FIG. 6 except that the pulse generator 46 is replaced by another pulse generator 60. This pulse generator 60 is similar to the pulse generator 46 shown in FIG. 6 in that it acts also to vary the frequency ratio and duty ratio. However, this pulse generator 60 differs from the pulse generator 46 in the manner of generation of pulse signals 60c and 60d used for controlling the thyristors 200 and 300 respectively. FIG. 9 shows the waveforms of the currents i₁, A, B and trigger pulse signals 60c and 60d.

In the circuit having the structure shown in FIG. 8, the trigger pulses 60c and 60d for triggering the thyristors 200 and 300 respectively appear with the timing shown in FIG. 9. Consequently, the thyristors 200 and 300 are triggered in response to the application of these trigger pulses 60c and 60d respectively. On the other hand, pulses 60a and 60b appear also from the pulse generator 60 and are applied to the switches 43 and 44 respectively, and the output signal from the differential amplifier 45 is applied to the base of the transistor 40 which supplies the current i₁ of pulse waveform shown in FIG. 9. It will be seen in FIG. 9 that there is a dead time t between the current pulses. This dead time t is selected to be longer than the turn-off time of the thyristors 200 and 300, and during this period of time t, the transistor 40 is turned off. Consequently, the thyristor 200 or 300 placed in the on state is automatically turned off within this period of time t. Therefore, the welding currents A and B having waveforms as shown in FIG. 9 are supplied to the first and second electrodes 4 and 5 respectively.

The trigger pulse signals 60c and 60d generated from the pulse generator 60 shown in FIG. 8 differ from the pulse signals 46a and 46b generated from the pulse generator 46 shown in FIG. 6 for the reasons described presently. The switches 2 and 3 in the circuit shown in FIG. 6 are the switching elements which are turned on in response to the application of the pulse signals 46a and 46b of "1" level respectively, and therefore, these pulse signals 46a and 46b are required to have waveforms as shown in (iii) and (iv) of FIG. 7b respectively. On the other hand, the thyristors 200 and 300 are used in lieu of the switches 2 and 3 in FIG. 8. The signal 60c is used as the gate signal applied to the thyristor 200, and the signal 60d is used as the gate signal applied to the thyristor 300. In this case too, a circuit similar to that shown in FIG. 7a may be used to generate these gate signals 60c and 60d. For example, the output signal OSC from the oscillator 73 may be used as the signal 60c, and the output signal E_c from the comparator 72 may be used as the signal 60d.

According to the embodiment shown in FIG. 8, the desired commutation can be attained without requiring various elements as those shown in FIG. 2 for turning off the main thyristors.

Figure 10:
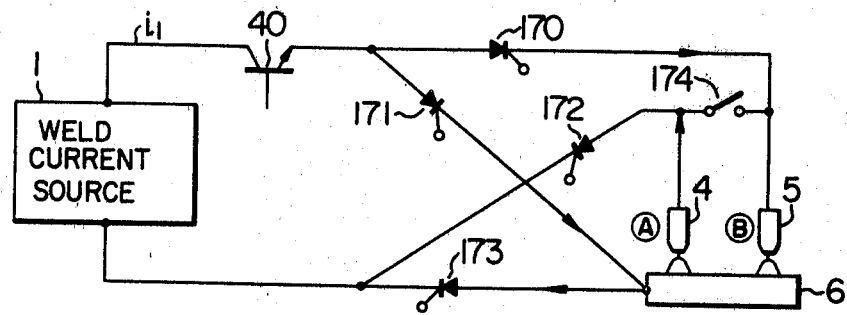
FIG. 10 is a circuit diagram of a two-electrode type welding apparatus controlled by still another embodiment of the method according to the present invention.
Figure 11A:
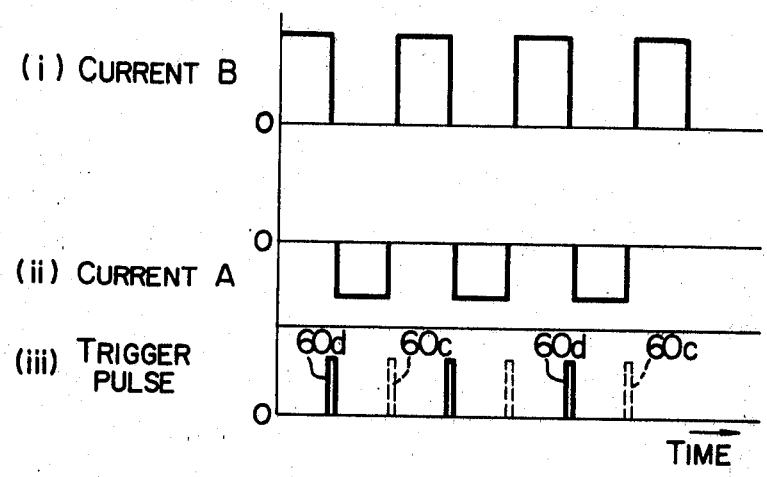
FIGS. 11a and 11b are time charts of the currents shown together with the trigger pulses in the welding apparatus shown in FIG. 10.
Figure 11B:
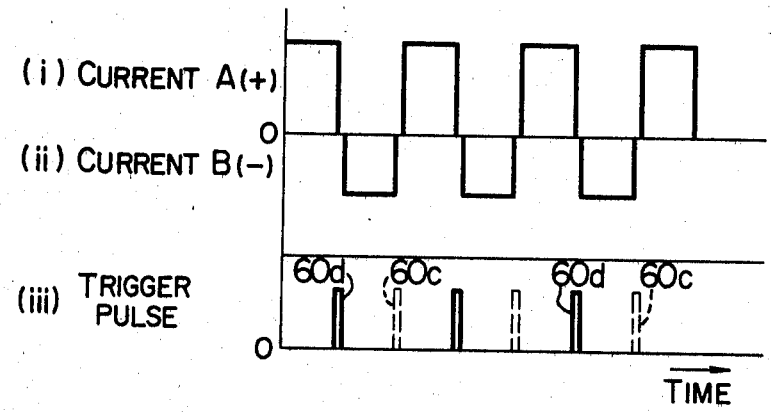

FIG. 10 shows an embodiment based on the embodiment shown in FIG. 8. In this embodiment, the directions of the welding currents A and B supplied to the respective electrodes 4 and 5 are made variable in an AC fashion as desired. The embodiment shown in FIG. 10 includes a plurality of main thyristors 170, 171, 172 and 173 which are turned on and off in a manner as described with reference to FIG. 8. When, for example, the main thyristors 171 and 172 are turned on, the welding current A from the transistor 40 flows through the route of the main thyristor 171→the workpiece 6→the first electrode 4→the main thyristor 172. When, on the other hand, the main thyristors 170 and 173 are turned on, the welding current B flows through the route of the main thyristor 170→the second electrode 5→the workpiece 6→the main thyristor 173. Thus, the welding currents A and B supplied to the first and second electrodes 4 and 5 respectively have different polarities and different amplitudes as seen in FIG. 11a. In the above operation, it is necessary to turn off a switch 174. When this switch 174 is turned on, the welding operation is similar to that carried out by a single electrode to which the welding current of rectangular waveform as shown in FIG. 11b is supplied.

The aforementioned embodiments of the present invention eliminate the necessity for provision of a thyristor commutation circuit. However, the desired objects of the present invention can be attained even when a commutation circuit as shown in FIG. 2 is also provided.

In the present invention, welding currents of different amplitudes are supplied to two electrodes respectively of a two-electrode type welding apparatus as described hereinbefore. Some examples of welding conditions will be described below to illustrate how the supply of such welding currents is effective for achieving successful welding on various metals.

(1) Workpiece of copper: The heat conductivity of cooper is about five times as high as that of a metal such as iron. Therefore, a workpiece of copper is generally continuously preheated at a temperature of about 400° C. to about 700° C. during welding. When the welding operation on such a workpiece is carried out by supplying a preheating current and a welding current having the same peak value to the two electrodes respectively, the degree of preheat will be insufficient because the peak value of the welding current supplied to the welding electrode is the same as that of the preheating current supplied to the preheating electrode. In such a case, the desired preheating effect can be obtained when the amplitude of the preheating current supplied to the preheating electrode is selected to differ from that of the welding current supplied to the welding electrode.

(2) Workpiece of steel: Welding on a workpiece of steel includes the problem of welding speed. When the welding speed is considerably high, a so-called humping phenomenon (formation of a cavity) tends to occur. In order to prevent deposition of humping beads due to this humping phenomenon, the amplitude of the welding current supplied to the trailing electrode should be selected to be larger than that of the welding current supplied to the leading electrode. That is, when the amplitude of the welding current supplied to the trailing electrode is made larger than that of the welding current supplied to the leading electrode according to the principle of the present invention, the objectionable humping phenomenon can be obviated, and proper welding can be ensured.

(3) Workpiece of aluminum: In the case of welding operation on a workpiece of aluminum, it is necessary to destroy the oxide film formed on the surface of the workpiece of aluminum before carrying out the welding operation. That is, the so-called cleaning action is required. When this cleaning action is carried out by supplying currents of the same peak or amplitude to the two electrodes respectively, it is necessary to supply these currents in an AC fashion to the plus electrode and minus electrode. In this case, the plus electrode tends to be consumed or fused. Such a defect can be obviated by the arrangement shown in FIG. 10 in which the currents have different peaks as shown in FIG. 11.

(4) Others: The above description has been directed to the manner of welding in which an area to be welded is directly molten without using a filler rod. However, the present invention is also applicable to welding using a filler rod. In such an application, the filler rod is regarded to be an electrode, and the welding currents of different peaks or amplitudes are supplied to the individual electrodes so as to deposit uniform beads.

Although the present invention has been specifically described with reference to its application to a welding apparatus having two electrodes, it is apparent that the present invention is also equally effectively applicable to multi-electrode type welding apparatus having more electrodes.

It will be understood from the foregoing detailed description that the present invention finds a widened range of applications in this field of welding.

What we claim is:

1. A method of controlling currents supplied to a plurality of electrodes of a welding apparatus having at least a leading electrode and a trailing electrode extending in the weld direction, and an electric power source for supplying welding currents to the welding apparatus for carrying out a welding operation on a workpiece by alternately supplying the currents to the individual electrodes, respectively, the method comprising the steps of selecting a sum of the values of the currents supplied to the individual electrodes in accordance with the material of the workpiece, setting each current supplied to each of the electrodes so that a sum of the values of each current equals the selected sum of the values and that a lower current is supplied to the leading electrode and a higher current is supplied to the trailing electrode with such current combination being selected to prevent molten metal from being driven away from the weld area, and carrying out the welding operation on the workpiece by alternately supplying the set current for each electrode to the individual electrodes, respectively.

2. An electrode current control method as claimed in claim 1, wherein the at least leading and trailing electrodes are in substantial alignment in the weld direction, in said setting step, the ratio between the currents supplied to the individual electrodes is set so that the sum of the values of the currents supplied to the individual electrodes is maintained at a predetermined value, and, in said carrying out step, the currents of the values set at said selected ratio are supplied to the individual electrodes respectively to carry out the welding operation.

3. An electrode current control method as claimed in claim 2, wherein said step of setting said selected ratio between the individual currents includes varying the durations of the currents supplied to the individual electrodes under the conditions that the sum of the values of the currents supplied to the individual electrodes is maintained at the predetermined value and all the currents have the same amplitude, and in said carrying out step, the currents havng the durations set at said selected ratio are supplied to the individual electrodes respectively to carry out the welding operation.

4. An electrode current control method as claimed in claim 2, wherein said step of setting said selected ratio between the individual currents includes varying the amplitudes of the currents supplied to the individual electrodes under the conditions that the sum of the values of the currents supplied to the individual electrodes is maintained at the predetermined value and all the currents have the same duration, and in said carrying out step, the currents having the amplitudes set at said selected ratio are supplied to the individual electrodes respectively to carry out the welding operation.

5. An electrode current control method as claimed in claim 2, wherein said selected ratio between the individual currents is set under the condition that the sum of the mean values of the currents supplied to the individual electrodes is maintained at the predetermined value.

6. An electrode current control method as claimed in claim 2, wherein said selected ratio between the individual currents is set under the condition that the sum of the effective values of the currents supplied to the individual electrodes is maintained at the predetermined value.

7. An electrode current control method as claimed in claim 1, wherein the step of setting includes setting the current supplied to the leading electrode to be substantially equal to the current supplied to the trailing electrode.

8. A welding apparatus comprising a plurality of electrodes including at least a leading electrode and a trailing electrode extending in the weld direction, the trailing electrode being inclined with respect to the leading electrode in the weld direction, electric power source means for supplying welding currents to the welding apparatus, and control means for enabling a welding operation on a workpiece by alternately supplying the currents to the individual electrodes, respectively, the control means including selecting means for selecting a sum of the values of the currents supplied to the individual electrodes in accordance with the material of the workpiece, setting means for setting each current supplied to each of the electrodes so that a sum of the values of each current equals the selected sum of the values, and switching means for alternately supplying the set current for each electrode to the individual electrodes, respectively, to enable carrying out of the welding operation.

9. A welding apparatus as claimed in claim 8, wherein the at least leading and trailing electrodes are in substantial alignment in the weld direction, said setting means includes means for setting a ratio between the currents supplied to the individual electrodes so that the sum of the values of the currents supplied to the individual electrodes is maintained at a predetermined value.

10. A welding apparatus as claimed in claim 9, wherein the means for setting the ratio between the individual currents includes means for varying the durations of the currents supplied to the individual electrodes under the conditions that the sum of the duration values of the currents supplied to the individual electrodes is maintained at the predetermined value with all the currents having the same amplitude.

11. A welding apparatus as claimed in claim 9, wherein said means for setting the ratio between the individual currents includes means for varying the amplitudes of the currents supplied to the individual electrodes under the conditions that the sum of the amplitude values of the currents supplied to the individual electrodes is maintained at a predetermined value with all the currents having the same duration.

12. A welding apparatus as claimed in claim 9, wherein said means for setting the ratio between the individual currents includes means for enabling the sum of one of the mean and effective values of the currents supplied to the individual electrodes to be maintained at the predetermined value.

13. A welding apparatus as claimed in claim 8, wherein the at least leading and trailing electrodes are in substantial alignment in the weld direction, said selecting means includes means for selecting one of a predetermined total time duration for the sum of the duration of the individual currents supplied to the individual electrodes and a total predetermined amplitude value for the sum of the amplitude values of the individual currents supplied to the individual electrodes, said setting means including potentiometer means for varying at least one of the time duration and amplitude value for the individual currents supplied to the individual electrodes, said switching means including transistor means connected between said power source means and said individual electrodes for controlling the operation thereof in response to the selecting means and setting means for enabling the carrying out of the welding operation.

14. A welding apparatus comprising a plurality of electrodes, electric power source means for supplying welding currents to the welding apparatus, and control means for enabling a welding operation on a workpiece by alternately supplying the currents to the individual electrodes, respectively, the control means including a plurality of first switching means connected, respectively, to the individual electrodes for enabling welding current to be supplied to the individual electrodes in accordance with the operation thereof, transistor means coupled between the electric power source means and the plurality of first switching means for controlling welding current to the individual electrodes pulse generator means for providing at least a plurality of pulse outputs corresponding to the number of individual electrodes, the pulse generator means including means for controlling the frequency and duty ratio of the pulse outputs, a plurality of potentiometer means corresponding to the number of individual electrodes, differential amplifier means for providing an output for controlling the transistor means, a plurality of second switching means connected between respective ones of the potentiometer means and one input terminal of the differential amplifier means, respective ones of the second switching means being responsive to different pulse outputs from the pulse generator means for controlling the operation thereof to supply a signal in accordance with the associated potentiometer means to the one input terminal of the differential amplifier means, means for detecting the welding current and for supplying the one input terminal of the differential amplifier with a signal indicative of the welding current so that the one input terminal of the differential amplifier means receives a signal of the difference of the signal applied through a respective one of the second switching means and the welding current detecting means, respective ones of the first switching means receiving output pulse signals from the pulse generator means for operation thereof corresponding with the output pulses received by corresponding respective ones of the second switching means, whereby the control means enables operation of the first and second switching means and the transistor means to provide a selected sum of values of currents to the individual electrodes in accordance with the material of the workpiece with each current supplied to each of the electrodes being applied alternately and the sum of the values of each current equaling the selected sum of the values.

15. A method of controlling currents supplied to a plurality of electrodes of a welding apparatus having at least a leading electrode and a trailing electrode extending in the weld direction, and an electric power source for supplying welding currents to the welding apparatus for carrying out a welding operation on a workpiece by alternately supplying the currents to the individual electrodes, respectively, the method comprising the steps of selecting the sum of the values of the currents supplied to the individual electrodes in accordance with the material of the workpiece, setting each current supplied to each of the electrodes so that a sum of the values of each current equals the selected sum of the values and that a higher current is supplied to the leading electrode and a lower current is supplied to the trailing electrode with such current combination being selected to prevent humping in high speed welding, and carrying out the welding operation on the workpiece by alternately supplying the set current for each electrode to the individual electrodes, respectively.

16. An electrode current control method as claimed in claim 15, wherein the at least leading and trailing electrodes are in substantial alignment in the weld direction, in said setting step, the ratio between the currents supplied to the individual electrodes is set so that the sum of the values of the currents supplied to the individual electrodes is maintained at a predetermined value, and, in said carrying out step, the currents of the values set at said selected ratio are supplied to the individual electrodes, respectively, to carry out the welding operation.

17. An electrode current control method as claimed in claim 16, wherein said first step of setting said selected ratio between the individual currents includes varying the durations of the currents supplied to the individual electrodes under the conditions that the sum of the values of the currents supplied to the individual electrodes is maintained at the predetermined value and all the currents have the same amplitude, and in said second step, the currents having the durations set at said selected ratio are supplied to the individual electrodes, respectively, to carry out the welding operation.

18. An electrode current control method as claimed in claim 16, wherein said first step of setting said selected ratio between the individual currents includes varying the amplitudes of the currents supplied to the individual electrodes under the conditions that the sum of the values of the currents supplied to the individual electrodes is maintained at the predetermined value and all the currents have the same duration, and in said second step, the currents having the amplitudes set at said selected ratio are supplied to the individual electrodes, respectively, to carry out the welding operation.

19. An electrode current control method as claimed in claim 16, wherein said selected ratio between the individual currents is set under the condition that the sum of the means values of the currents supplied to the individual electrodes is maintained at the predetermined value.

20. An electrode current control method as claimed in claim 16, wherein said selected ratio between the individual currents is set under the condition that the sum of the effective values of the currents supplied to the individual electrodes is maintained at the predetermined value.

21. An electrode current control method as claimed in claim 15, wherein the step of setting includes setting the current supplied to the leading electrode to be substantially equal to the current supplied to the trailing electrode.

* * * * *